June 19, 1934.   D. B. GARDNER   1,963,127
PRISM
Filed May 22, 1933    2 Sheets-Sheet 1
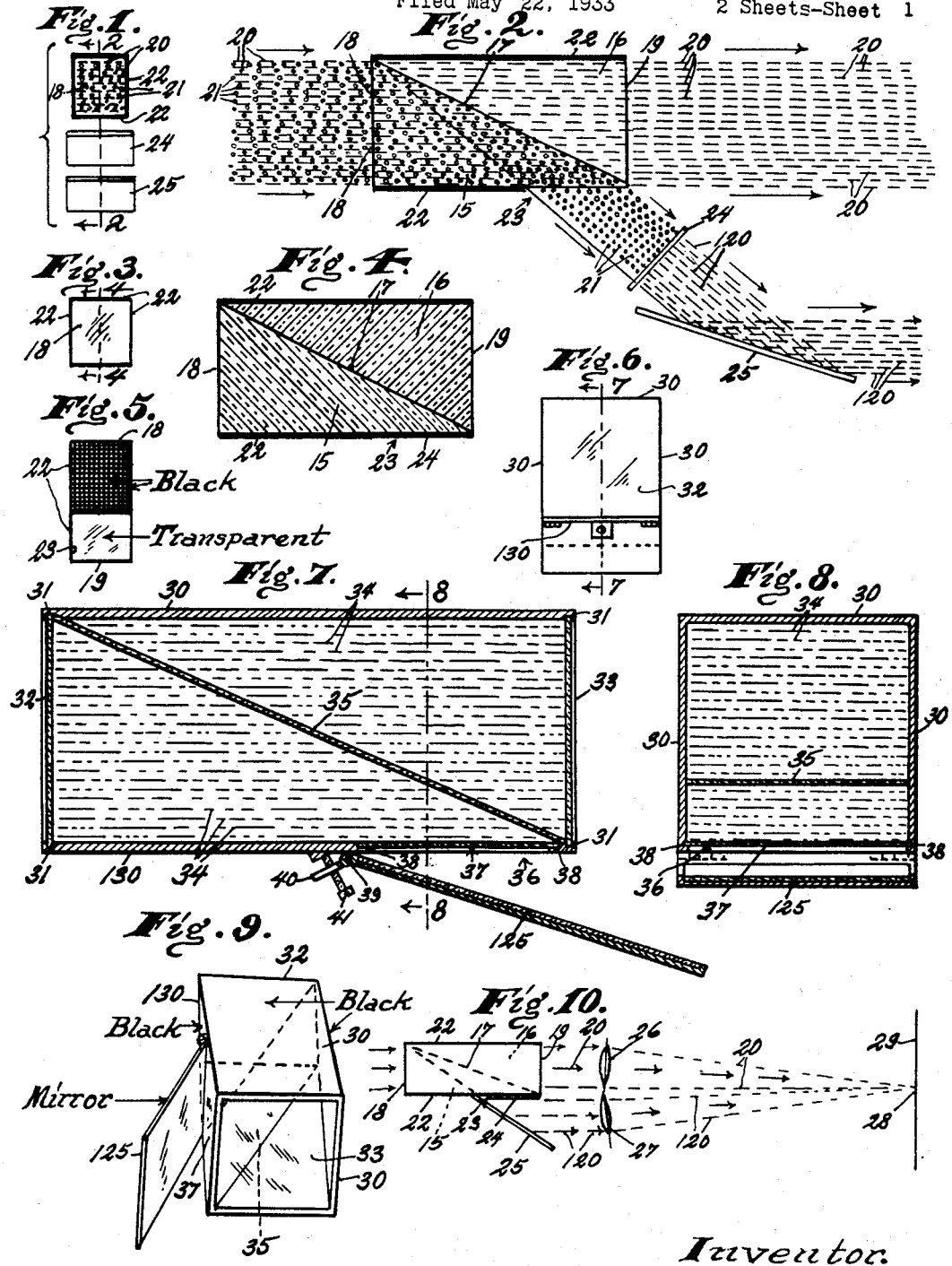
Inventor.
Delamere B. Gardner.
By
William M. Gentle
His Attorney.

June 19, 1934.  D. B. GARDNER  1,963,127
PRISM
Filed May 22, 1933  2 Sheets-Sheet 2
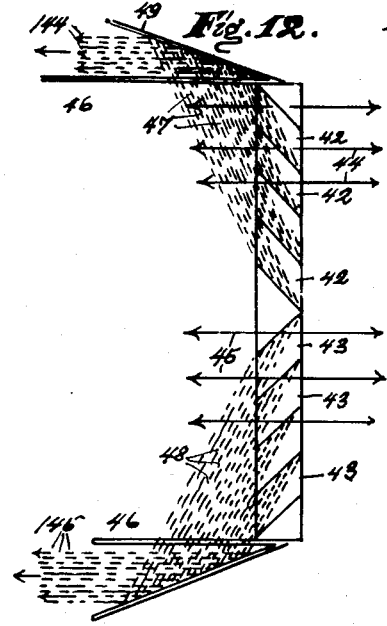
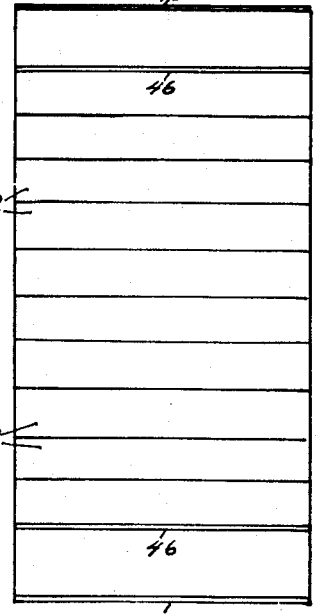
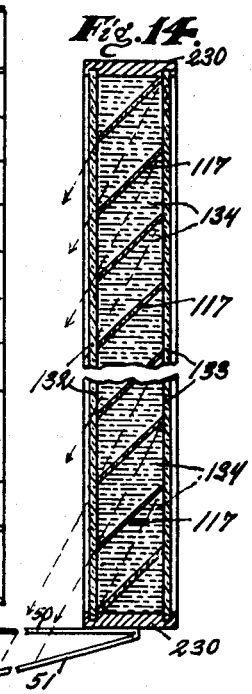
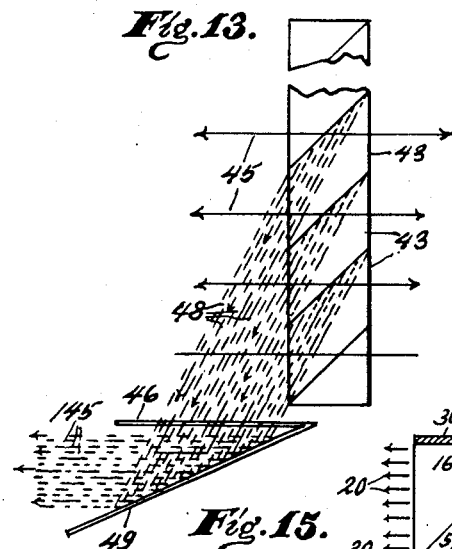
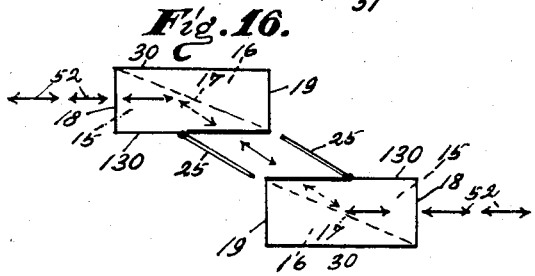
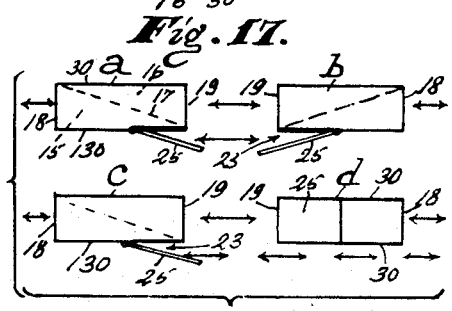
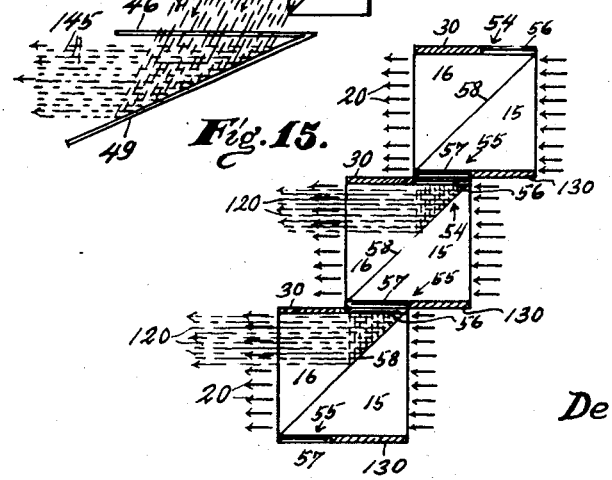
Inventor.
Delamere B. Gardner.
By
William M. Gentle
His Attorney.

Patented June 19, 1934

1,963,127

UNITED STATES PATENT OFFICE 1,963,127

PRISM

Delamere B. Gardner, Los Angeles, Calif.

Application May 22, 1933, Serial No. 672,266

1 Claim. (Cl. 88—14)

This invention relates to an improvement in prisms, and the principal object is to provide a double-acting liquid prism that in the first instance separates the light into ordinary and extraordinary rays so that the extraordinary rays can pass in a relatively straight course through and out of the prism; and in the second instance the prism is constructed so that the ordinary rays are reflected angularly out through a window on one side of the prism with means in connection therewith for turning the reflected ordinary rays of light as they pass out of the prism to thereby convert them into extraordinary rays of light, and then reflecting these converted rays into a course parallel with the course of the natural extraordinary rays of light, and thereby greatly increase the volume of such light. In other words, I provide means for converting practically all of the ordinary rays in the prism into extraordinary rays so that practically all of it can be utilized.

As is well known, prisms made heretofore have had their sides painted black so that the blackened surfaces within the prisms have absorbed the ordinary rays of light; and instead of absorbing these rays I provide a window in my prism through which the ordinary rays are passed and utilized.

It is understood that the words "ray" and "rays" are used to indicate vibrations of light, whether they be visible or ultra-visible rays.

Another object of this invention is to increase the efficiency and usefulness of a prism by providing a relatively simple means for practically doubling the amount of extraordinary rays of light passing therefrom.

Features of invention are shown in passing the rays of ordinary light through a side opening or window in the prism, turning the rays as they pass from the prism and then reflecting the turned rays either into or out of a course parallel to the straight course of the extraordinary rays of light.

Another feature of invention is shown in providing a prism two or more of which can be used in a series or a multiple of series in addition to converting ordinary into extraordinary rays of light.

Another feature of invention is shown in utilizing a single sheet of transparent multiple refracting material to turn the ordinary rays of light from a plurality of prisms and reflect the turned rays into a course parallel to the course of the extraordinary rays from all the prisms.

Another feature of invention is shown in constructing my prism so it can be used in a series in which the prisms are arranged so the cleavage plane of adjacent prisms are utilized to reflect the converted extraordinary rays of light into courses parallel to the course of the natural extraordinary rays of light.

Other objects, advantages and features of invention may appear from the accompanying drawings, the subjoined detailed description and the appended claim.

The accompanying drawings illustrate the invention, in which:

Figure 1 is a diagrammatic end view of my improved prism showing the parts associated with it grouped together by a bracket.

Fig. 2 is a central longitudinal view through the prism and associated parts shown in Fig. 1 as viewed from the line 2—2, and the passage of light into the prism on the left side is diagrammatically indicated by dot and dash lines, and on the right side the ordinary rays are shown separated from the extraordinary ray and also the ordinary rays are shown turned sufficiently to convert them into extraordinary rays; also a mirror is shown in this figure for deflecting the converted extraordinary rays into a course parallel to the other extraordinary rays.

Fig. 3 is an end view of a solid prism with the mirror omitted.

Fig. 4 is an enlarged central longitudinal section on line 4—4, Fig. 3, showing the sides of the prism opaque and a transparent covered window in one side thereof.

Fig. 5 is a semidiagrammatic bottom view of the prism showing in Fig. 3, showing a window therein that has a transparent cover formed of multiple refracting material.

Fig. 6 is an end view of a liquid prism that is constructed in accordance with this invention.

Fig. 7 is an enlarged central longitudinal section on line 7—7, Fig. 6, showing a mirror adjustably connected to the bottom of the prism.

Fig. 8 is a cross section on the line 8—8 of Fig. 7.

Fig. 9 is a perspective view of the prism shown in Fig. 6, omitting the means for adjusting the mirror.

Fig. 10 is a view on a small scale analogous to Fig. 2, showing that the two volumes of extraordinary rays of light can be converged or united.

Fig. 11 is a diagrammatic front view of a plurality of prisms in an assembled body and having below them a common means for converting the ordinary rays of light from all the prisms into extraordinary rays and reflecting them in lines parallel to the lines of the other or natural extraordinary rays.

Fig. 12 is a diagrammatic side view of the prisms shown in Fig. 11.

Fig. 13 is a diagrammatic side view of a plurality of prisms having a common means for turning their ordinary rays into extraordinary rays and then reflecting them in a course parallel to the other extraordinary rays.

Fig. 14 is a semidiagrammatic central vertical section through a compound liquid prism.

Fig. 15 is a central vertical section through a plurality of prisms arranged in a stepped relation to one another so there is a coaction between them in separating the ordinary from the extraordinary rays of light and then turning and reflecting the separated ordinary rays in a direction parallel to the course of the natural extraordinary rays of light.

Fig. 16 is a diagrammatic view of two of my liquid prisms arranged adjacent one another so the light can pass through their adjacent side windows in either direction.

Fig. 17 is another diagrammatic view of a group of my liquid prisms showing how they can be arranged in groups of two or more.

In detail the prism shown diagrammatically in Figs. 1 to 5 inclusive is formed of solid crystals 15 and 16 with a cleavage plane 17 between them. The ends 18 and 19 are open so the light can enter, and so the extraordinary rays 20 can pass through and out of it in the usual way.

Heretofore the ordinary rays 21 that have been interrupted by the plane 17 have been reflected onto and absorbed by the black sides 22 of the prism that are painted a heavy black for that purpose. In my prism I remove a portion of this black paint from the bottom side to form a window 23 through which the ordinary rays 21 can pass out of the prism instead of being absorbed by the black wall as has heretofore been done. I then cover this window with a sheet of transparent multiple refracting material 24 that will rotate the ordinary rays 21 as they pass through it and thereby convert them into other extraordinary rays 120. These converted rays will then be similar in all respects to the extraordinary rays 20 that in the first instance have passed through the prism in a relatively straight course.

Adjacent the window I then place a mirror 25 for reflecting the converted extraordinary rays 120 in a direction parallel to the course of the extraordinary rays 20. If desired the extraordinary rays 20 and 120 can be converged as diagrammatically illustrated in Fig. 10. As seen therein, the lenses 26 and 27 are arranged in the paths of the rays 20 and 120 and focused so the two volumes of light rays converge at the point 28 in the screen 29.

It is obvious that lenses and mirrors can be used to converge the rays 120 with the rays 20 so they move in substantially the same direction or course.

In Figs. 6 to 10 inclusive I show semidiagrammatically the construction of my liquid prism which in use produces the same result as obtained by the solid prism, except that my liquid prism can be made much larger. That is, the solid crystal prism is limited as to its size, necessarily being very small, but in this prism the size is unlimited.

The prism includes the opaque sides 30, 130 that have their adjacent edges secured together to exclude light and also have transverse registering grooves 31 in their ends in which the edges of the glass end plates 32 and 33 are secured so they form a water-tight enclosure in which a solution of transparent multiple refracting fluid 34 is placed. Also secured in this enclosure is a partition 35 that is formed of a solid transparent multiple refracting material. This partition separates the fluid 34 into two equal parts and function as a cleavage plane to produce the same result in this prism as the plane 17 effects between the crystals 15 and 16 shown in Fig. 4.

A window 36 is cut in the bottom side 130 through which the separated ordinary ray can pass, and this window is closed by a cover 37 that is formed of transparent multiple refracting material, and its edges are secured in the recess 38 so they form a liquid-tight seal on the window, see Figs. 7 and 8. This transparent multiple refracting cover 37 rotates the ordinary rays of light as they pass through it, so they become extraordinary rays of light, or rays of light that in all respects are like the other extraordinary rays.

A mirror 125 is pivotally secured to the bottom side 130 adjacent the window 36 by the hinge 39, and secured to the hinged edge of the mirror is a flange extension 40 through which an adjusting screw 41 is extended for adjusting the mirror relative to window 36 and its transparent multiple refracting cover 37 so it can be used to reflect the converted extraordinary rays 120 in lines parallel to the extraordinary rays 20.

In Figs. 11, 12 and 13 I show a plurality of prisms 42 and 43 arranged in a tier through which the extraordinary rays of light can pass in the usual manner in either direction as indicated by the arrows 44 and 45, and under and above these prisms I arrange sheets 46 of transparent multiple refracting material through which the downward and upward reflected ordinary rays from all the prisms can pass and be rotated as heretofore described. Also under and above these prisms I arrange the mirrors 49 for reflecting the converted rays 144 and 145 in the direction of the respective arrows 44 and 45. In other words this arrangement of parts provides a device through which the light is reversible.

In Fig. 14 I show a compound liquid prism in which the glass ends 132 and 133 are secured in the opaque side walls 230, and the interior is filled with a transparent multiple refracting liquid 134 through which a plurality of transparent multiple refracting partitions 117 are secured. This compound liquid prism is provided with a sheet 50 of transparent multiple refracting material and also its mirror 51, as diagrammatically shown below this prism.

In Fig. 15 I show my prisms provided with oppositely arranged windows 54 and 55 with the upper window covered with an unrefractory cover such as glass 56, and the lower window covered with a sheet of multiple-refractory material 57, with the windows arranged so that the lower window registers with the upper one.

The prisms are arranged so that the ordinary ray of light from an upper prism is rotated as it passes into the next prism below it from whence it is reflected forward in lines parallel with the extraordinary rays by the cleavage planes 58. It is obvious that the position of the windows 54 and 55 and also the glass 56 and transparent sheets of multiple refracting material can be reversed if desired. That is, each prism should have one window covered with glass 56 and the other with the material 57.

In Fig. 16 two of my liquid prisms are shown arranged so that the light indicated by arrows 52 can pass through their side windows 36 in either direction; and in Fig. 17 a plurality of my liquid prisms are shown grouped together, indicating that they can be used in various combinations of groups. In other words, $a$ and $b$ form one group, and $a$ and $c$ another, $c$ and $d$ another, and $b$ and $d$ another.

The prism is used as hereinbefore fully shown and described.

I claim as my invention:

A liquid prism including glass ends and opaque sides secured together to form a liquid-tight enclosure, a transparent multiple refracting liquid in said enclose, a transparent solid multiple refracting partition in said liquid that is arranged to form a cleavage plane and separate said liquid into equal parts, two windows through said opaque sides that are arranged on opposite sides of said partition, a glass for covering one of said windows, and a transparent sheet of multiple refracting material for covering the other window so that said prism can be used separately or in a series with other prisms.

DELAMERE B. GARDNER.